(12) United States Patent
Nakayama

(10) Patent No.: US 6,436,177 B1
(45) Date of Patent: Aug. 20, 2002

(54) SETTING COMPOSITION AND INK, PAINT AND ADHESIVE CONTAINING THE SAME COMPOSITION

(75) Inventor: Yasuharu Nakayama, Kanagawa (JP)

(73) Assignee: Kansai Paint Co., Ltd., Kanagawa (JP)

( * ) Notice: Subject to any disclaimer, the term of this patent is extended or adjusted under 35 U.S.C. 154(b) by 0 days.

(21) Appl. No.: 09/653,211

(22) Filed: Aug. 31, 2000

(30) Foreign Application Priority Data

Sep. 3, 1999 (JP) ............................................. 11-288581

(51) Int. Cl.$^7$ ................................................ C09D 11/10
(52) U.S. Cl. ................................ 106/31.13; 525/330.5; 525/376; 525/383; 525/384; 525/386; 525/418; 525/452; 525/461; 525/480; 525/523; 525/50; 428/524
(58) Field of Search ............................... 525/330.5, 376, 525/383, 384, 386, 418, 452, 461, 480, 523, 50; 106/31.13; 428/524

(56) References Cited

U.S. PATENT DOCUMENTS 3,025,265 A  *  3/1962  Maeder
4,176,103 A  *  11/1979  Cruden et al.

* cited by examiner

*Primary Examiner*—Robert Dawson
*Assistant Examiner*—Kuo-Liang Peng
(74) *Attorney, Agent, or Firm*—Rader, Fishman & Grauer, PLLC

(57) ABSTRACT

A curable composition, which can be easily decomposed and removed by means of a mixed solution of acid, water, and optionally an organic solvent, is provided. The curable composition contains a resin (A) having a structure of structural formula represented by formula (1)

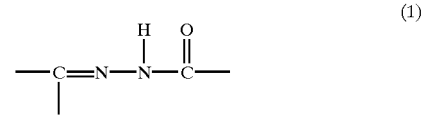

and crosslinkable functional group(s) in one molecule.

8 Claims, No Drawings

SETTING COMPOSITION AND INK, PAINT AND ADHESIVE CONTAINING THE SAME COMPOSITION

FIELD OF THE INVENTION

The present invention relates to a curable resin composition to be used for resin processing and molding which has decomposability and does not prevent recycling of itself or materials to which it is attached, and a resin to be used for paints, inks, adhesives and the like containing the resin composition.

BACKGROUND OF THE INVENTION

Currently, a large quantity of resins is used for preparing paints, inks, adhesives and resin processed moldings. These are generally used once and then thrown away, and their treatment after use such as their decomposition is not considered. Therefore, it is hindered to recycle not only the resins themselves but also the materials that are covered with these resins or to which these resins are attached.

For improving the above point, the present inventor found that the chemical structure represented by formula (1) below in a molecule could easily decompose by the contact with an acid, water and a solvent at the same time. Thereafter, a method for removing it was applied for a patent, i.e., Japanese Patent Application No. 10-219156/1998.

SUMMARY OF THE INVENTION

The present invention relates to a resin composition to which such method for such removal is applicable. At present, as a system to which the method for removal is applicable, there is paint where a resin containing a carbonyl group is cured with a dihydrazide compound, for example. However, since the chemical structure of formula (1) is formed at the curing in that method, the paint cannot be applied to the case where crosslinking is not required or where crosslinking is carried out by other means such as light, heat or the like, so that its usable range is limited.

As a result of extensive studies for improving the defect, the present inventor has found that the problem is solved by incorporating the linkage in a resin itself, and therefore has accomplished the invention.

The present invention relates to a curable composition containing a resin (A) having the structure of the structural formula represented by the formula (1) below:

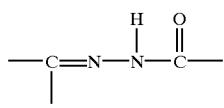

(1)

and a crosslinkable functional group or groups in one molecule. Particularly, the structure of the structural formula represented by formula (1) present in the resin (A) may be formed by the reaction of a carbonyl group with a hydrazide group or a semicarbazide group.

Further, the crosslinkable functional group (or groups) present in the resin (A) may be one type or two or more types selected from a polymerizable double bond, hydroxyl group, carboxyl group, isocyanate group, amino group, thiol group, epoxy group, triazine group, dimide group, silanol group, an alkoxysilyl group, methylol group, an alkylmethylol group, an acetoalkoxy group, carbonyl group, hydrazide group, a blocked isocyanate group, a blocked carboxyl group and a blocked hydroxyl group.

Still further, the resin (A) may be that having one or more structures of the structural formula represented by the formula (1) between the crosslinkable functional groups.

The resin may be a resin having the structure of the structural formula represented by formula (1) in the backbone of the resin and the crosslinkable functional group in the side chain.

Additionally, the resin (A) may be a resin having the same number of the structure or structures of the structural formula represented by formula (1) and the crosslinkable functional group or groups.

PREFERRED EMBODIMENTS OF THE INVENTION

An organic resin which contains the structure of the structural formula represented by formula (1) and a coexisting crosslinkable functional group may be used as the resin (A). The examples of the organic resin may include such as an acryl resin, alkyd resin, vinyl resin, urethane resin, epoxy resin, polyester resin or polyether resin.

The structural formula represented by formula (1) can be decomposed in the presence of moisture, under an acidic atmosphere, or preferably in an organic solvent, and can be formed, for example, by a reaction of a compound containing carbonyl group with a compound containing hydrazide group and/or a compound containing semicarbazide group. Furthermore, the crosslinkable functional group may be introduced, for example, by using a compound containing carbonyl group or hydrazide group which also possesses the crosslinkable functional group.

Examples of the compound containing carbonyl group include such as diacetone alcohol or 4-hydroxy-2-butanone. Examples of the compound containing hydrazide group include such as iminodiacetic acid dihydrazide, adipic acid dihydrazide, carbohydrazide, glutaric acid dihydrazide, azelaic acid dihydrazide, dodecanoyldihydrazide, cyclohexanetricarboxylic acid trihydrazide, tartaric acid dihydrazide or crotonic acid dihydrazide. Diacetone acryl amide, acrolein and the like may be mentioned as the compound containing carbonyl group which further possesses a polymerizable double bond as the crosslinkable functional group.

More concretely, in the case of polymerization-type resins such as an acryl resin and vinyl resin, the resin (A) can be obtained by copolymerizing polymerizable unsaturated monomers each having the structure of the structural formula represented by formula (1) and a crosslinkable functional group, or by addition or condensation reaction of compounds each having the structure of the structural formula represented by formula (1) and a crosslinkable functional group to a polymerization-type resin. In the case of condensation-type resins such as alkyd resins and polyester resins, the resin (A) can be obtained by using a reaction product of a compound containing carbonyl group and hydroxyl group or carboxyl group with a compound containing two or more hydrazide groups and/or semicarbazide groups as at least part of polyhydric alcohol or polybasic acid. In the case of urethane resins, the resin (A) can be obtained by using a reaction product of a compound containing carbonyl group and hydroxyl group with a compound containing hydrazide group and/or semicarbazide group as a polyhydric alcohol and reacting it with a polyisocyanate. In the case of epoxy resins, the resin (A) can be obtained by adding a reaction product of a compound containing carbonyl group with a compound containing hydrazide group and/or semicarbazide group to an epoxy resin or by adding a compound having amino group or carboxyl group and hydrazide group to an epoxy group and subjecting to dehydrative condensation of a compound having carbonyl group with the hydrazide group. In the case of polyether resins, the resin (A) can be obtained in a similar manner to the above epoxy resin case using a polyether resin having epoxy groups.

The crosslinkable functional group to be introduced into the resin (A) at the same time when the structure of the structural formula represented by formula (1) is introduced is not particularly limited, and may be exemplified by a polymerizable double bond, hydroxyl group, carboxyl group, isocyanate group, amino group, thiol group, epoxy group, triazine group, dimide group, silanol group, alkoxysilyl group, methylol group, alkylmethylol group, acetoalkoxy group, carbonyl group, hydrazide group, locked isocyanate group, blocked carboxyl group and blocked hydroxyl group. One type or two or more types of these groups may be introduced in the same molecule.

The resin (A) containing a polymerizable double bond can be by itself cured with crosslinking by oxidative polymerization or irradiation with an active energy beam such as light or electron beam. The other crosslinkable functional group is preferably used in combination with a crosslinking agent (B) having a functional group reactive thereto.

The examples of the crosslinking agent (B) include polyisocyanate compounds, polyepoxy compounds, melamine resins, urea resins, benzoguanamide resins, polyoxy compounds, polycarbonyl compounds, polyhydrazine compounds, polyamine compounds, polysemicarbazide compounds, polydimide compounds, polyacetoacetoxy compounds, polysilanol compounds, polyalkoxysilyl compounds and the like. Two or more of them may be used in combination.

The curable resin composition of the present invention may contain a coloring pigment, an extender, a thickening agent, a defoaming agent, an organic solvent, water, a plasticizer, a resin other than the above, if necessary.

The method for curing the curable resin composition of the present invention may be optionally selected depending on the crosslinkable functional group of the resin (A) and the composition of the crosslinking agent (B), and the resin composition can be cured under room temperature, heating, irradiation with an active energy beam and the like.

The resin composition of the present invention thus cured with crosslinking can be decomposed by bringing it into contact with an aqueous solution of formic acid, acetic acid, p-toluenesulfonic acid, dodecylbenzenesulfonic acid, sulfuric acid, phosphoric acid or the like, and further with a solution containing an organic solvent, and thereby the cured composition can be removed.

EXAMPLES

The following will explained the present invention in detail with reference to the examples.

Examples 1 to 4

Two hundred parts by weight of DENACOL EX-841 (an epoxydated polyethylene resin manufactured by Nagase Chemicals Ltd.), 200 parts by weight of N-methylpyrrolidone and 84 parts by weight of iminodiacetic acid dihydrazide were mixed and reacted at 100° C. for 4 hours to obtain slightly colored highly viscous liquid. To the solution was added 177 parts by weight of diacetone acryl amide and 0.3 parts by weight of SUMILIZER BHT (a polymerization inhibitor manufactured by Sumitomo Chemical Co., Ltd.). The mixture was stirred for a long period of time and then stored as it was.

A phtoinitiator, IRGACURE (manufactured by Ciba specialty Chemicals Corp.) was incorporated into the solution in an amount of 3% and the resin was cured by UV irradiation. Table 1 shows curing conditions, test results of coating properties, and re-dissolving time.

TABLE 1

|  | Example 1 | Example 2 | Example 3 | Example 4 |
|---|---|---|---|---|
| Added monomer species | None | None | i-BMA | P-FA2 |
| Added amount (resin/monomer) | — | — | 2/1 | 2/1 |
| Exposure dose (mmJoule/cm$^2$) | 300 | 1500 | 3000 | 1500 |
| Film thickness ($\mu$m) | 20 | 15 | 12 | 18 |
| Pencil hardness | H | H | H | HB |
| Adhesiveness | 100/100 | 100/100 | 100/100 | 100/100 |
| Impact resistance (½ φ, 1 kg) | 50< | 50< | 50< | 50< |
| Acetone resistance * | No change | No change | No change | No change |
| Re-dissolving property (minute) ** | 1.5 | 3.5 | 1 | 5 |

(Notes)
* : The appearance of the coating was observed after one drop of acetone was placed on the coating and then evaporated.
** : The coating was immersed in a coating-dissoiving solution of toluene/isopropyl alcohol/water/p-toluenesulfonic acid = 42/45/10/3, and the time for dissolution of the coating was measured.
i-BMA: isobutyl methacrylate
P-FA2: PLACCEL FA2 (a functional monomer manufactured by Daicel Chemical Industries Ltd.)

Examples 5 to 7

After 208.8 parts by weight of adipic acid dihydrazide and 278.4 parts by weight of diacetone alcohol was mixed, the mixture was subjected to dehydration under heating at 120° C. for 15 hours to obtain an adduct of adipic acid dihydrazide and diacetone alcohol. The product was isolated by dissolving it into 360 parts by weight of N-methylpyrrolidone.

The concentration of solid mass of the adduct solution was about 60%. A 200 parts by weight portion of the solution was heated to 80° C. and, after the addition of one drop of dibutyltin dilaurate, 37 parts by weight of tolylene diisocyanate (TDI) was added dropwise over a period of one hour, followed by the maintenance at that temperature for further 4 hours. The absence of isocyanate group was confirmed on IR measurement.

To 10 parts by weight of the solution was added 1 part by weight of SUMIDUR N3500 (manufactured by Sumitomo Bayer Urethane Co., Ltd.). The resulting solution was painted on a plate treated with zinc phosphate by means of a bar coater and dried according to the method shown in Table 2. Table 2 also shows coating properties and re-dissolving property.

TABLE 2

|  | Example 5 | Example 6 | Example 7 |
|---|---|---|---|
| Drying conditions | drying at room temperature for 7 days | drying at 60° C. for 30 minutes then at room temperature for 7 days | drying at 120° C. for 30 minutes then at room temperature for 7 days |
| Film thickness ($\mu$m) | 23 | 22 | 26 |
| Pencil hardness | H | H | 3H |
| Adhesiveness on latticecut test | 100/100 | 100/100 | 100/100 |

TABLE 2-continued

|  | Example 5 | Example 6 | Example 7 |
|---|---|---|---|
| Impact resistance (½ φ, 1 kg) | 10 cm | 10 cm | 10 cm |
| Water resistance (immersing in water for 7 days) | No change | No change | No change |
| Re-dissolving property (minute) * | 2 | 20 | 30 |

(Note)
* : The time for dissolution of the coating when it was immersed in a solution of N-methylpyrrolidone/water/p-toluenesulfonic acid = 78/10/3 at 60° C.

The curable composition of the present invention can be easily decomposed by an aqueous solution of formic acid or the like or the solution additionally containing an organic solvent, and therefore serves an excellent effect that it is easy to recycle the materials to which the composition are attached.

The disclosure of Japanese Patent Application No. 11-288581 filed Sep. 3, 1999 including specification, drawings and claims are herein incorporated by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A curable composition comprising a resin (A) having a structure represented by formula (1):

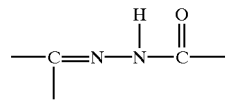

and a crosslinkable functional group in the molecule of the resin (A),
wherein the resin (A) has at least one said structure represented by the formula (1) in the backbone of the molecule of the resin (A) between the crosslinkable functional groups.

2. The curable composition according to claim 1, the structure is formed by reaction of a carbonyl group with a hydrazide group or a semicarbanzide group.

3. The curable composition according to claim 1, the crosslinkable functional group in the resin (A) is one type or two or more types selected from a polymerizable double bond, hydroxyl group, carboxyl group, isocyanate group, amino group, thiol group, epoxy group, triazine group, dimide group, silanol group, alkoxysilyl group, methylol group, alkylmethylol group, acetoalkoxy group, carbonyl group, hydrazide group, blocked isocyanate group, blocked carboxyl group and blocked hydroxyl group.

4. The curable composition according to claims 1, the resin (A) contains the structure of the structural formula represented by the formula (1) and the crosslinkable functional group in a side chain of the resin (A).

5. The curable composition according to claim 1, the crosslinkable functional group is combined with a backbone of the resin (A) through the structure of the structural formula represented by the formula (1).

6. The curable composition according to claim 1, the resin (A) has same number of the structure of the structural formula represented by the formula (1) and the crosslinkable functional group.

7. A curable composition comprising the resin (A) according to claim 1 and a croslinking agent (B) reactive to the crosslinkable functional group.

8. An ink, paint, or adhesive containing the curable composition according to claims 1.

* * * * *